United States Patent [19]

Yanagisawa et al.

[11] Patent Number: 4,560,026

[45] Date of Patent: Dec. 24, 1985

[54] PARKING SYSTEM FOR AN ARTICULATED TRICYCLE

[75] Inventors: Yasuhisa Yanagisawa; Yasuhiko Tsukiji, both of Saitama, Japan

[73] Assignee: Honda Giken Kogyo Kabushiki Kaisha, Tokyo, Japan

[21] Appl. No.: 562,850

[22] Filed: Dec. 19, 1983

[30] Foreign Application Priority Data

Dec. 20, 1982 [JP] Japan .................. 57-191120[U]

[51] Int. Cl.⁴ ............................................ B62H 5/06
[52] U.S. Cl. .................................. 180/287; 70/233; 70/236
[58] Field of Search .................. 180/287, 280, 286; 70/233, 236

[56] References Cited

U.S. PATENT DOCUMENTS

| | | | |
|---|---|---|---|
| 2,617,288 | 11/1952 | Hinds | 70/233 |
| 3,788,108 | 1/1974 | Norcross | 70/233 |
| 3,789,634 | 2/1974 | Brown | 70/233 |
| 4,232,537 | 11/1980 | Plaiss | 70/233 |

Primary Examiner—Richard A. Bertsch
Attorney, Agent, or Firm—Lyon & Lyon

[57] ABSTRACT

A parking locking system for an articulated or swing-type tricycle. A parking lever mounted to the handlebars of the steerable wheel actuates a cable and a rod. The rod engages a spring loaded slideable pin member into a hole in a plate fixed to the front frame of the steerable wheel. If the pin is not aligned with one of the holes in the plate, the spring will deform and the pin will slide relative to the rod. Upon further rotation of the front handlebars to a position where the pin member is aligned with a hole, the compression in the spring will cause the pin to interengage with the fixed plate thus locking the front steering wheel. The actuation of the cable interengages locking arms with a plate attached to the front of the swing shaft and with a parking gear in the drive train, respectively. A spring-loaded lever resisting interengagement of the locking arms is used to create tension in the cable and retract the locking arms when the parking lever is deactivated.

6 Claims, 12 Drawing Figures

PARKING SYSTEM FOR AN ARTICULATED TRICYCLE

BACKGROUND OF THE INVENTION

The field of the present invention is locking systems for multiwheeled vehicles, and more particularly locking systems to prevent motion and unauthorized use of such vehicles.

Small multiwheeled vehicles are a great convenience to the users of such vehicles. Such vehicles are highly mobile and easily maneuvered and parked. There is, however, a need to secure such vehicles from theft or unauthorized use.

Articulated or swingable tricycles have been developed which generally include a front body having a steerable front wheel, a seat and the requisite frame to support the same. A rear body includes two rear wheels, an engine and a power train. The engine is generally coupled to an axle of the rear wheel of such vehicles by a conventional chain and sprocket mechanism. The tricycle may be articulated between the front body and the rear body such that the rear body may swing in a vertical plane about a transverse axis through a bracket; and the front body may roll relative to the rear body and relative to the ground about a longitudinal axis through a roll joint.

In an articulated or swing-type tricycle, a parking lever has been employed which will lock the rear wheels and limit lateral swing of the front body in order to securely park the tricycle and protect the tricycle against theft. Such a mechanism, however, fails to secure the front steerable wheel.

SUMMARY OF THE INVENTION

In order to provide proper security for an articulated or swing-type tricycle, it is advantageous to provide a locking mechanism which will secure the rear wheels, the front body against tilting, and the steerable front wheel with respect to the front body. The present invention is directed to such a system which is compact and easy to operate while still providing the requisite security. In addition, it is desirable to use as few parts as possible and to minimize the cost of such a parking system.

The parking system described herein uses a parking lever attached to a cable and a link, such as a rod. The rod engages a spring-loaded pin with a fixed plate to lock the front wheel. If the pin is not aligned with a hole in the plate, the spring will be compressed. When the front wheel is turned so that alignment is achieved, the pin will become engaged with the fixed plate thus locking the front steerable wheel. The rear wheels and the swing bracket and roll joint are secured by cable actuated locking levers which interengage with locking plates or gears, thus securing the entire tricycle from theft or unauthorized use.

It is an object of this invention to provide a secure yet simple locking system for such a tricycle. Another object of the invention is to reduce the number of operative parts and to minimize the cost of such a security system. Other and more detailed objects of the invention will become obvious upon examination of the drawings and specifications herein.

DETAILED DESCRIPTION OF THE INVENTION

Figure 1:
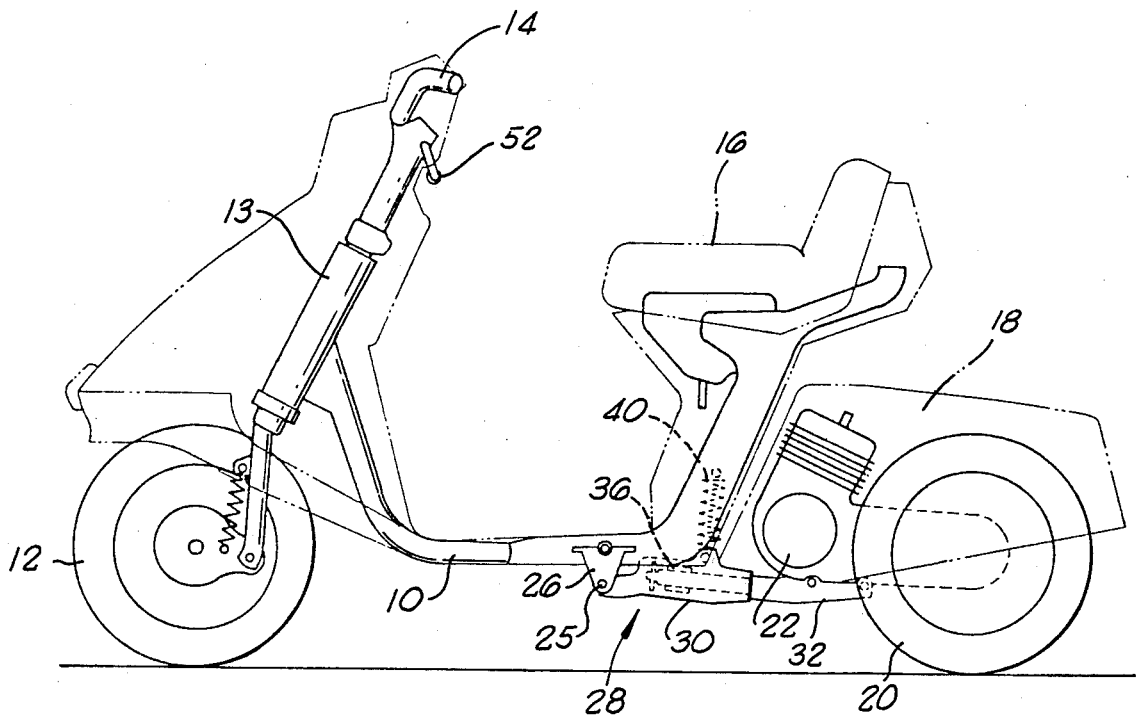
FIG. 1 is a side view showing an articulated or swing-type tricycle including an embodiment of the locking system in accordance with the invention.

As shown in FIG. 1, a typical articulated tricycle has a front body 10 including a steerable front wheel 12, handle bars 14 and a seat 16, as well as a rear body 18 including two rear wheels 20, an engine 22 and a drive train mechanism 24. The drive train mechanism 24 may be conventional chain and sprocket type mechanism or other conventional means.

While the preferred embodiment of the invention is used with an articulated tricycle as shown in FIG. 1, no such limitation as to use should be inferred. The invention is equally applicable to other small multi-wheeled vehicles for which a means to secure the steerable wheel in connection with securing other parts of the multi-wheeled vehicle would be advantageous. When the multi-wheeled vehicle is an articulated tricycle, as shown in FIG. 1, the front body 10 is connected to the rear body 18 through a roll joint 28. The roll joint 28 enables the rear body 18 to swing in a vertical plane about a transverse axis 25 through a bracket 26. It also enables the front body 10 to roll relative to the rear body 18 about a longitudinal axis through the roll joint 28.

Figure 2:
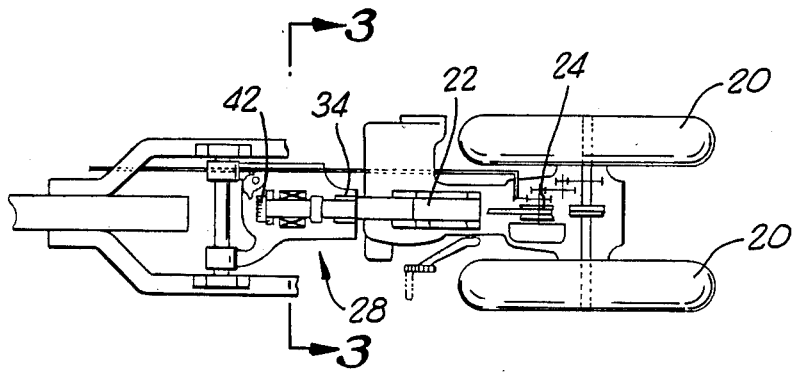
FIG. 2 is a bottom plan view showing the major components of an articulated or swing-type tricycle.
Figure 3:
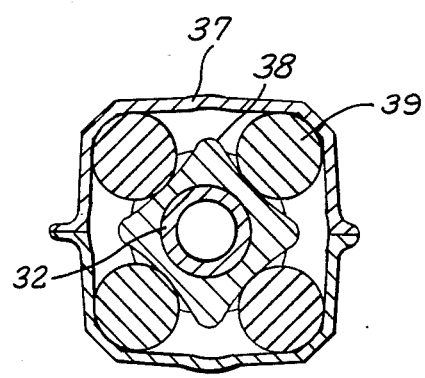
FIG. 3 is a front cross-sectional view taken substantially along the line 3—3 of FIG. 2.

As shown in FIGS. 2 and 3, the roll joint consists of a bearing 34 and a Neithart mechanism 36. The Neithart mechanism 36 has an outer shell 37 integrally connected to the joint case 30, which is pivotally mounted to the bracket 26. Within this outer shell 37, an inner member 38 is fitted about the swing shaft 32 and surrounded by a multitude of elastically deformable members 39.

Upon rotation about the longitudinal axis of the swing shaft 32, the elastically deformable members 39 deform to allow the front body 10 to lean while the rear wheels 20 remain in contact with the ground. A cushion member 40 is used between the rear body 18 of the tricycle and the front body 10 of the tricycle to stabilize the swinging of the rear body 18 relative to the front body 10, thus ensuring a smooth ride.

Figure 4:
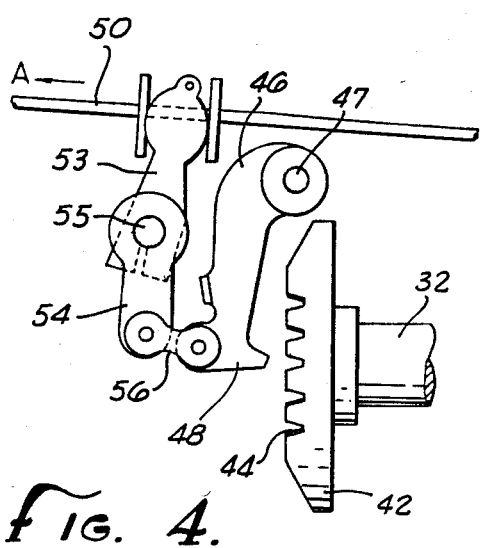
FIG. 4 and FIG. 5 are side views of the swing joint locking portion showing the swing joint in the unlocked and locked condition, respectively.
Figure 5:
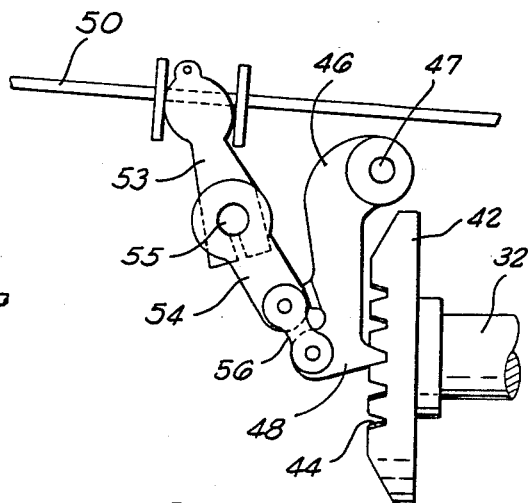

As shown in FIGS. 4 and 5, the articulated tricycle swing shaft 32 has a locking plate 42 attached at its front end. Grooves 44 are formed on the face of the swing locking plate 42. A locking hook 46 with a protrusion 48 formed on one side is pivotally mounted about point 47 such that the protrusion 48 may, upon activation of the parking lever 52, interengage the grooves 44 on the face of the swing locking plate 42. A parking cable 50 is used to engage the locking devices upon activation of the parking lever 52, which is pivotally mounted to the tricycle frame 13 near the handlebars 14. A pair of arms 53, 54 are pinned together at point 55 and connected to a rigid link 56 to engage and secure the locking hook 48 with the swing locking plate 42 upon activation of the parking cable 50.

Figure 7:
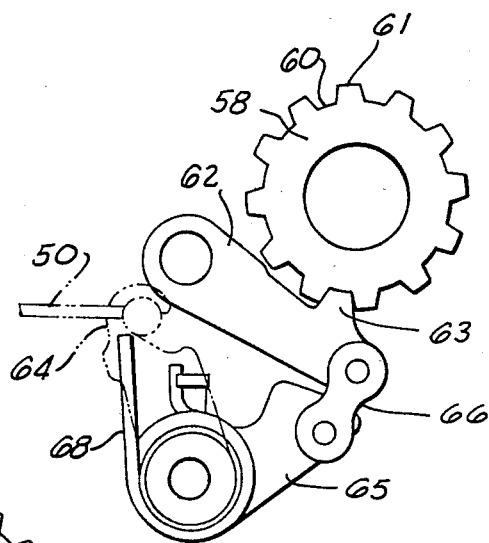
FIG. 6 and FIG. 7 are side views of the rear wheels locking portion showing the rear wheels in an unlocked and locked condition, respectively.
Figure 6:
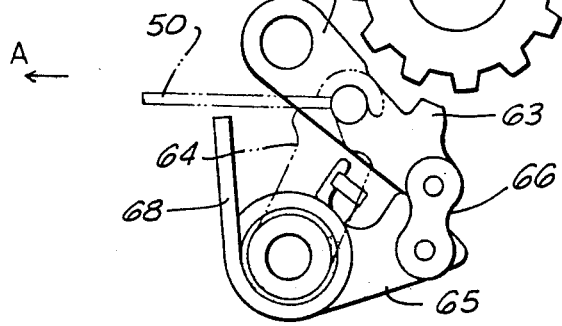

The rear wheels of the articulated or swing-type tricycle are secured as shown in FIGS. 2, 6 and 7, by using a parking gear 58 attached to a driven shaft in the power train 24. The parking gear 58 has a series of grooves 60 and teeth 61 formed about its circumferential face. Upon activation of the parking cable 50, a lock arm 62 with a projection 63 formed on one side pivots to allow the projection 63 to interengage with one of the parking gear grooves 60. The lock arm 62 is actuated by a pivoting lever 64 which is connected to the parking cable 50 and also attached to another pivoting arm 65. The pivoting arm 65 is connected to the lock arm 62 by a rigid link 66. The lever 64 is actuated by the tension in the parking cable 50 upon engagement of the parking lever 52. In addition, a spring 68, bearing against the frame 13 and the pivoting lever 64, opposes the tension in the parking cable 50 from activation of the parking lever 52. Thus, deactivation of the parking lever 52, the spring 68 acts to release the various locking mechanisms by retracting the parking cable 50.

Figure 8:
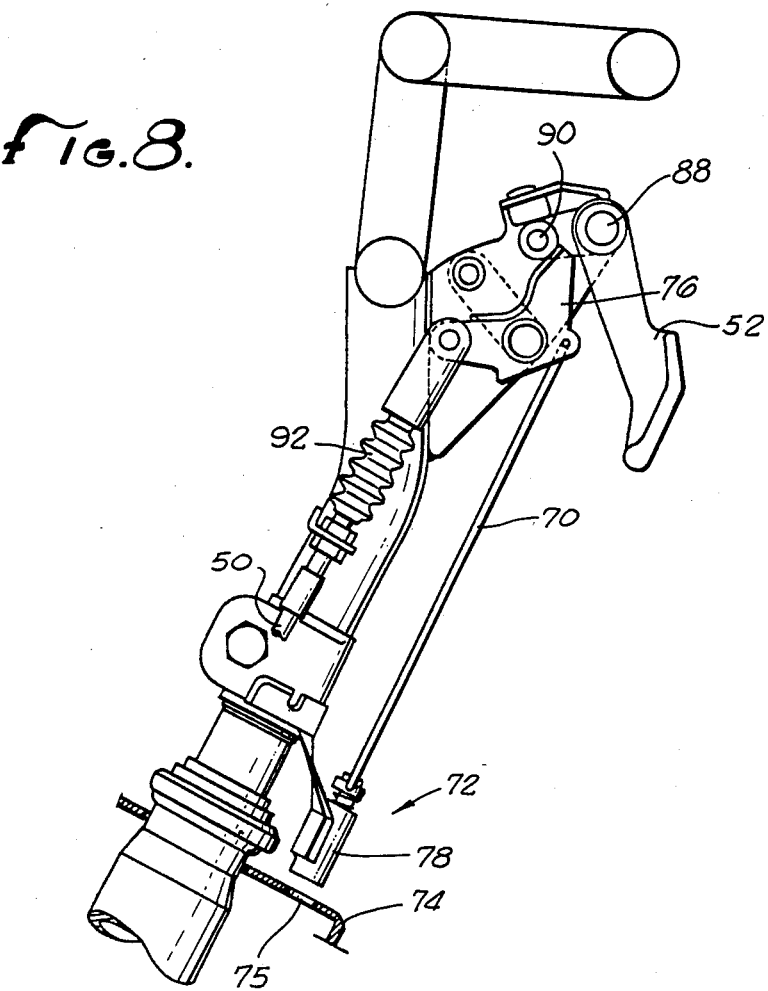
FIG. 8 is a side view of the front wheel locking mechanism and the parking lever for engaging the locking system, the parking lever being shown in the disengaged position.

The locking mechanism for securing the front wheel 12, as shown in FIG. 8, consists of a rigid rod 70, one end of which is swingably and slideably attached to a locking pin 72. The other end of the rigid rod 70 is affixed to a reciprocating link arm 76 which is actuated by the parking lever 52. A steering locking plate 74, with a series of circular holes 75 formed therethrough and spaced about its periphery, is attached to the frame 13 of the tricycle.

Figure 10:
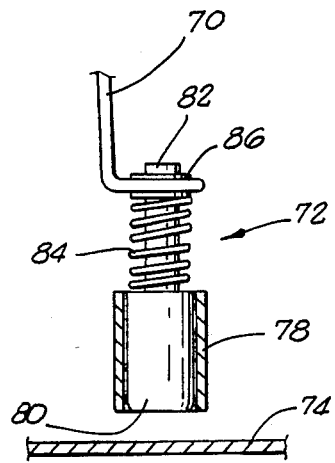
FIG. 10 is a partially cut-away side view of the front wheel locking member shown in the disengaged position.
Figure 11:
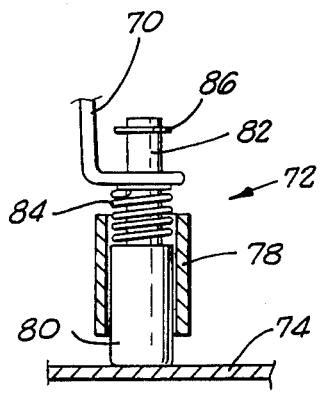
FIG. 11 is a partially cut-away side view of the front wheel locking member shown in the partially engaged position due to the member not being aligned with the hole in the fastening plate; and, FIG. 12 is a partially cut-away side view of the front wheel locking member shown in its fully engaged position.
Figure 12:
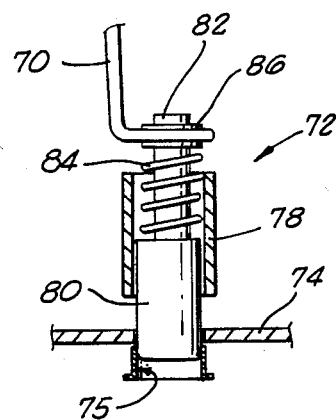

As shown in FIGS. 10-12, the locking pin 72 is slideable within a guide sleeve 78 attached to the tricycle frame 13 and has an enlarged stopper portion 80, which slides within the guide sleeve 78, and an upper shaft 82 which slides with respect to the rod 70. A spring 84 bears between the end of the rigid rod 70 and the enlarged stopper portion 80 of the locking pin 72 to inhibit the sliding of the upper shaft 82. A retainer 86 is used at the top of the upper shaft 82 to allow the spring 84 to remain slightly in compression even when the locking pin 72 is in its fully extended position.

Figure 9:
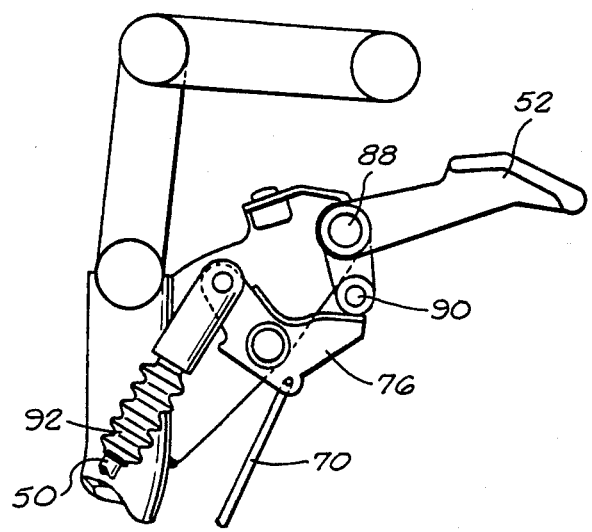
FIG. 9 is a side view of the upper front tricycle body wherein the parking lever is shown in the engaged position.

As shown in FIGS. 8 and 9, the parking lever 52 is pivotally mounted to the front body 10 of the tricycle. A roller 90 is attached to the parking lever 52 in order to transfer leverage from the parking lever 52 to the link arm 76. As shown in FIG. 9, when the parking lever 52 is raised, the roller 90 moves along the upper face of the link arm 76 thus causing it to pivot. This pivoting places a downward force on the rigid rod 50 and an upward force on the cable joint 92, thus creating tension in the parking cable 50.

When the parking lever is in the engaged position, as shown in FIG. 9, the tension upon the cable 50 will engage the locking mechanisms as shown in FIGS. 5, 7 and 12. The engagement of the parking level 52 is maintained because the roller 90 travels beyond the vertical so that the tension in the cable 50 tends to keep the parking lever 52 in the engaged position. If, upon actuation of the parking lever 52, the front steering locking pin 72 is not aligned with one of the holes 75 in the steering locking plate 74, the upper shaft 82 will slide relative to the rigid rod 70 and cause further compression in the spring 84. Upon turning the front wheel 12 via the handlebars 14 to a position where the enlarged stopper portion 80 is aligned with one of the holes 75 in the steering locking plate 74, the compression of the spring 84 will cause the enlarged stopper 80 to interengage with that hole 75, thus preventing further movement of the front wheel 12 until the parking system is deactivated.

Upon deactivation of the parking lever 52, as shown in FIG. 8, the parking locking system will become disengaged as shown in FIGS. 4, 6, and 10. The disengagement is assisted by the rear spring 68 which creates tension in the cable 50 in a direction which tends to encourage disengagement of the parking locking system. This tension causes the link arm 76 to rotate to its deactivated position, as shown in FIG. 8, thus retracting the front locking pin 72 from the hole 75 in the steering plate 74, the locking hook 48 from on the swing lock plate 42 and the locking arm 62 from the parking gear 58.

Although a preferred embodiment of the invention is described above, it is not intended to limit the nature or scope of the invention thereby described.

What is claimed is:

1. A locking system for a tricycle having a drive train, a steering column, and a body articulated about a swing shaft, comprising
   a parking lever;
   first locking means for selectively locking the drive train fixed relative to the body;
   second locking means for selectively locking the articulated body and swing shaft;
   linkage means for operatively connecting said first and second locking means to said parking lever;
   a link;
   a pin member slidably engaging said link;
   a spring biasing said pin member relative to said link in a first direction;
   a steering locking plate having holes therethrough, one of said plate and said link being mounted to the steering column and the other of said plate and said link being mounted to the body;
   said parking lever actuating said link to extend said pin member for selectively engaging said holes.

2. The locking system of claim 1 wherein said first locking means includes a parking gear connected to the drive train and a pivotally mounted locking arm connected to the body, said linkage means including a cable actuated by said parking lever, said linkage means actuating in turn said pivotally mounted locking arm to selectively engage said parking gear.

3. The locking system of claim 1 wherein said second locking means includes a locking plate having grooves therein, said plate being affixed to one end of the swing shaft, and a pivotally mounted locking hook, said linkage means including a cable actuated by said parking lever, said linkage means actuating in turn said locking hook to selectively engage a said groove in said locking plate.

4. The locking system of claim 1 wherein said link is a rigid rod.

5. The locking system of claim 1 wherein said link is mounted to the steering column and said steering locking plate is mounted to the body.

6. The locking system of claim 1 further comprising a sleeve, said sleeve being fixed to the steering column, said locking pin being slidably positioned within said sleeve, said spring being between said link and said pin.

* * * * *